Dec. 27, 1932.    G. B. PERKINS    1,892,117
COOKING DEVICE
Filed Nov. 11, 1930

INVENTOR.
George B. Perkins
BY
Harvey R. Hawgood
ATTORNEY.

Patented Dec. 27, 1932

1,892,117

UNITED STATES PATENT OFFICE

GEORGE B. PERKINS, OF PASADENA, CALIFORNIA

COOKING DEVICE

Application filed November 11, 1930. Serial No. 494,885.

This invention relates to cooking devices such as toasters for toasting bread and the like.

The invention to which it relates is particularly adapted to the use in electrical apparatus as electrical toasters.

An object of the invention is to provide an improved method and means for applying predetermined markings to an article of diet, such as a piece of toast.

Another object is to provide an improved marking apparatus which will be simple in construction and will automatically apply a predetermined design to an article being cooked.

Other objects will hereinafter appear.

Figure 1:
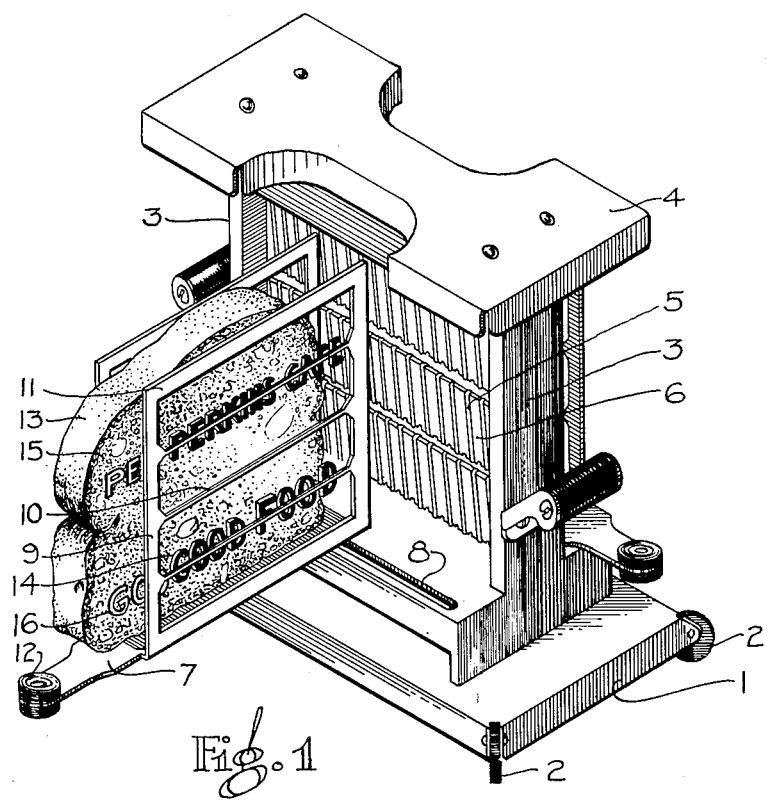
Figure 2:
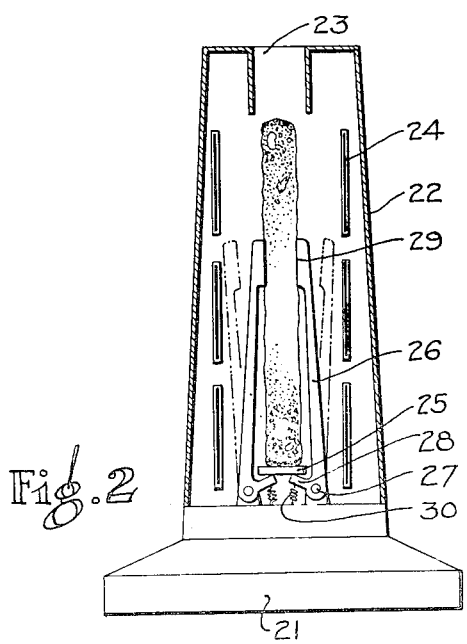

The invention will be better understood from the description of two practical embodiments thereof, illustrated in the accompanying drawing, in which;

Figure 1 is a perspective view of one embodiment of the invention incorporated in an electric toaster of a type commonly used for toasting bread on the table; and Figure 2 is an end elevation, partially in section, of an embodiment of the invention applied to a different type of electric toaster.

In the apparatus illustrated in Figure 1, the toaster consists of a base 1 supported on insulating feet 2 and having two upwardly extending supports 3 adjacent its ends, the upper ends of the supports being connected by a horizontal top 4. Between the supports are arranged heating elements, these being illustrated as coils of wire 5 supported on strips of insulating material 6.

At each side of this heating structure is provided a channel-shaped holder for a piece of bread, the holder consisting of a flat bottom portion 7 which is pivotally and slidably mounted in slot 8 in a lateral extension of the supporting members 3. Two vertical sides, consisting of side bars 9, transverse bars 10, and upper bars 11, are conveniently formed integrally with the bottom member 7, and the latter member is provided with a heat insulating handle 12 by which it may be conveniently manipulated. The parts so far described are merely illustrative of a number of types of toasters already on the market.

A piece of bread 13 may be inserted in either holder, and by manipulation of the handle 12 either side may be exposed to the heat of the heating elements 5. I have provided a series of letter-shaped shields 14 conveniently supported upon two of the bars 10, these shields being formed preferably of heat insulating material such as asbestos, fiber, phenolic condensation products or the like. These letters may spell any desired legend or the shields may be in the shape of any desired designs, trade-marks or other devices, instead of being letter-shaped. The shields, being carried by the bread holder, are interposed between the surface of the bread and the heating elements, being closely adjacent the former, and so prevent any radiated heat reaching the surface of the bread over which they lie. As a result, while the majority of the surface of the bread becomes darker due to being partially carbonized (as shown at 15), as the cooking process progresses, that covered by the shields remains light (as illustrated at 16, darkening, if at all, only slightly, and the resultant piece of toast has clearly delineated upon its surface in lighter lines the design of the shields, these being contrasted to the darker background.

In the embodiment illustrated in Figure 2, a form of toaster as illustrated having a base 21 provided with an upwardly extending casing 22 having a slot 23 in its top through which a piece of bread may be inserted. Electrical heating elements 24 are positioned within the casing adjacent both sides of the space for receiving the bread, and the supply of electricity to these is controlled by switch operated by a lever 25 which is depressed when the piece of bread or the like is inserted. Devices of this kind which are automatic in their operation are arranged to release the lever 25, projecting the piece of toast after it has been completely cooked, through the slot at the top of the casing.

I have provided two levers or arms 26 pivoted as at 27 adjacent the bottom of the casing, each lever being provided with an inwardly extending arm 28 arranged to be contacted by the lever 25 when in its lowermost position, and so to swing arms 26 together, so that their upper ends will be brought into contact with the piece of bread. These ends are provided at 29 with shields of the desired shape, which in this manner are held upon the surface of the bread and protect it from the radiant heat of the electrical heating elements, as in the embodiment above described.

Compression springs 30 are positioned between the arms 28 and the bottom of the casing, and as soon as the lever 25 begins to move upwardly, move the arms 26 outwardly into the positions indicated in dot-and-dash lines, so that they will not interfere with the free upward movement of the piece of toast.

While I have described the illustrated embodiments of my invention in some particularity, obviously this is done by way of illustration only, it being apparent that many other embodiments will readily occur to those skilled in this art, and I do not therefore limit myself to the precise details shown and described herein, but claim as my invention, all embodiment, variations and modifications coming within the scope of the subjoined claims.

I claim:

1. A cooking device comprising spaced electrical heating elements between which an article of food may be placed, a support for an article of food retained in one position during the cooking operation, and movable at the completion of the operation to eject said article, supports between the article and the heating elements, heating-insulating shields carried by said supports, and automatic means moving the shields into contact with the article of food and actuated by the movement of the support.

2. A cooking device comprising spaced electrical heating elements between which an article of food may be placed, a support for said article of food retained in one position during the cooking operation and movable at the completion of the operation to eject the article, supports between the article and the heating elements, heat-insulating shields carried by said supports, automatic means moving the shields into contact with the article actuated by the movement of the support, and resilient means for moving said shields away from said article when the cooking is completed.

In testimony whereof I hereunto affix my signature this 24th day of October, A. D. 1930.

GEORGE B. PERKINS.